Patented June 21, 1932

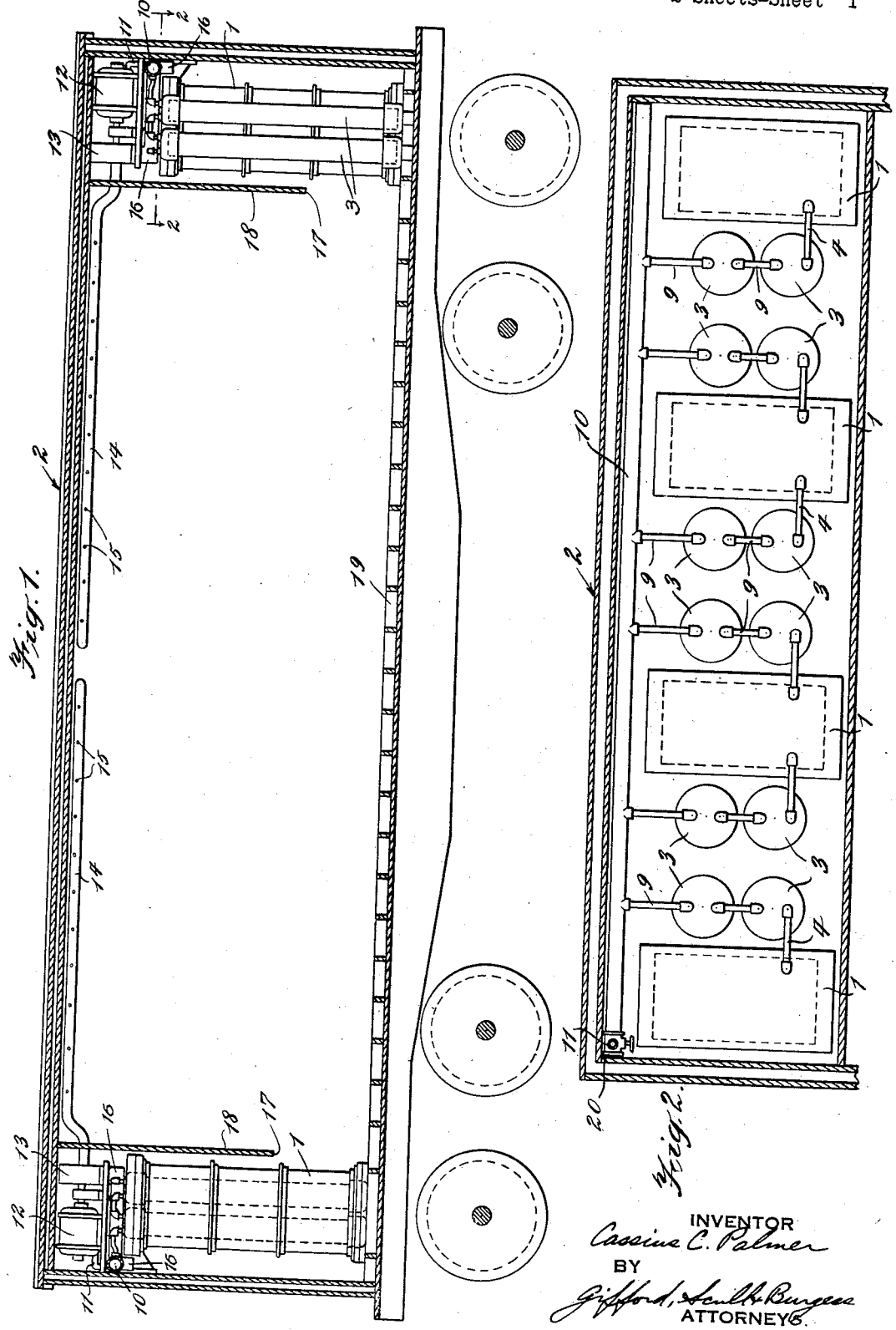

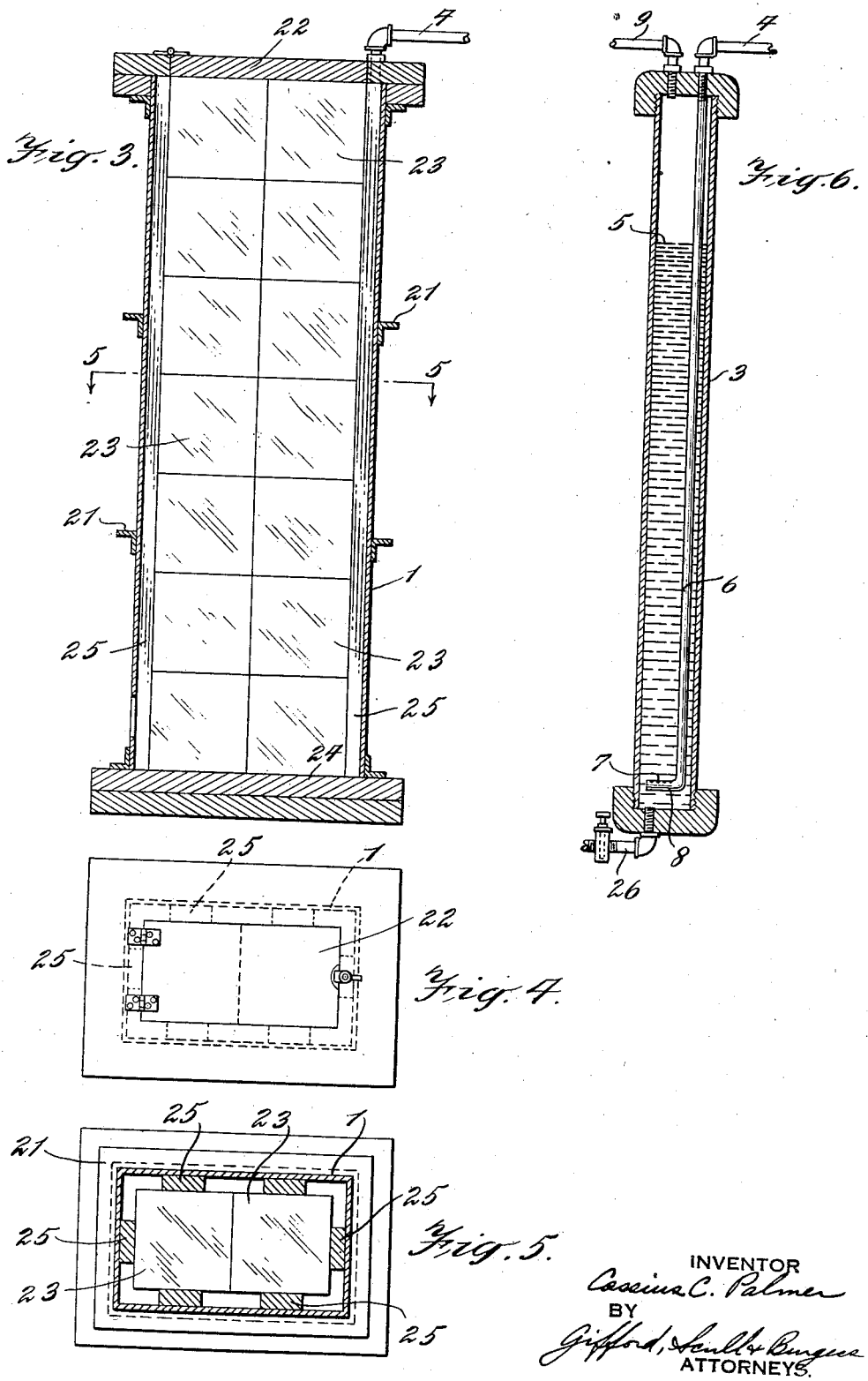

1,863,635

UNITED STATES PATENT OFFICE

CASSIUS C. PALMER, OF NEW YORK, N. Y.

REFRIGERATING APPARATUS

Application filed July 3, 1929. Serial No. 375,674.

This invention relates to a novel and improved refrigerating apparatus and method, particularly adapted for use in connection with refrigerating cars. The invention will be described in connection with said cars, although it is to be understood that other uses therefor may be found.

In the accompanying drawings, in which I have shown a selected embodiment of the invention;

Fig. 1 is a longitudinal sectional view through a refrigerating car having my invention installed therein.

Fig. 2 is a horizontal sectional view through one end of the car shown in Fig. 1, taken approximately on the line 2—2 of Fig. 1.

Fig. 3 is a vertical sectional view through one of the containers for solid carbon dioxide.

Fig. 4 is a view of the top of the container shown in Fig. 3.

Fig. 5 is a section on the line 5—5 of Fig. 3.

Fig. 6 is a vertical section through one of the brine tanks.

According to the invention as practiced with the illustrated embodiment, solid carbon dioxide is stored in containers 1. In the form shown, a plurality of these containers are disposed across the ends of a refrigerating car 2. This car may be of any well-known construction, and will not be described in detail. While the invention is shown as installed in a car, it is, of course, to be understood that it may be used in other locations.

I preferably use each container in conjunction with one or more brine tanks 3, in this form each container being associated with a battery of two brine tanks connected in series. As best shown in Fig. 2, the top of each container 1 is connected to one of the tanks 3 by a pipe 4, and by this connection a carbon dioxide gas which is formed by the melting solid in the container, passes into the adjacent tank 3 which may be filled with brine up to some such level as indicated at 5 (Fig. 6). While I shall, for the sake of simplicity, refer to "brine", it is of course to be understood that any other suitable liquid or substance may be employed in place of brine. The gas entering one of the brine tanks is carried downwardly through a vertical pipe 6 and discharged through holes 7 in a horizontally extending leg 8 on the lower end of the pipe 6. The gas then rises through the brine and is discharged through an outlet 9. This outlet 9 may be connected to a second tank or may be connected directly to an exhaust pipe 10.

In Fig. 2, I have shown a plurality of sets, each set consisting of one container and two brine tanks connected in series between the container and the exhaust pipe. It is, of course, to be understood that the number of sets may be varied to fit particular conditions. The exhaust pipe is provided with a connection 11 through which the exhaust gases may pass to a motor 12 and operate this motor in passing therethrough. The motor, in turn, operates a fan 13 adapted to draw air in through exhaust pipes 14 which are shown as extending along the top of the space which it is desired to subject to refrigerating action. These pipes are provided with suitable holes 15 through which the relatively hot gases in the top of the space may be drawn, and the fan is provided with an outlet 16 adapted to discharge these gases downwardly into the space behind the containers and tanks, and then outwardly beneath the lower edge 17 of a partition 18 and into the space in the car in which the goods are stored. The car is shown as being provided with racks 19, upon which may be supported the goods in the car and, by this arrangement, the gases discharged downwardly from the outlets 16 may circulate beneath the goods.

In order to regulate the pressure in the brine tanks, I provide a valve 20 by which the rate of exhaust may be controlled, and thus the pressure regulated. It will be seen that by manipulating the valve, the rate of melting of the solid carbon dioxide may be regulated, and thus the temperature of the car can be maintained at a desired point. By passing the carbon dioxide gas through the brine, the cooling effect of heat absorption in the brine is imparted to the air in the car. Preferably, the containers 1 are made of sheet steel, as shown, braced with angle bars 21 and each provided with a door 22 through which the cakes 23 of solid carbon dioxide may be inserted. The lower end 24 of the tank is preferably made of wood to act as an insulator, and insulating strips 25 of wood may be inserted between the walls and the cakes of carbon dioxide in the containers. The brine tank 3 may be provided with suitable drains 26, as shown in Fig. 6.

I claim:—

1. In a refrigerating system, means forming a storage space, a container for solid carbon dioxide, an exhaust pipe through which carbon dioxide gas from the melting dioxide may escape, a motor, means to run said motor by said escaping gas, an air exhaust pipe adjacent the top of said space, a fan operated by said motor and adapted to draw air from the storage space through said air exhaust pipe, and means to discharge said air adjacent the bottom of said space.

2. In a refrigerating system, means forming a storage space, a container for solid carbon dioxide, an exhaust pipe through which carbon dioxide gas from the melting dioxide may escape, a motor, means to run said motor by said escaping gas, an air exhaust pipe adapted to draw air from said space, and a fan operated by said motor and adapted to draw air through said air exhaust pipe.

3. In a refrigerating system, means forming a storage space, a container for solid carbon dioxide, an exhaust pipe through which carbon dioxide gas from the melting dioxide may escape, a motor, means to run said motor by said escaping gas, an air exhaust pipe adapted to draw air from said space, a fan operated by said motor and adapted to draw air through said air exhaust pipe, and to discharge it back into said space at a point remote from the air exhaust pipe.

4. In combination, a container for solid carbon dioxide, a connection to said container through which gas from the melting dioxide may pass, a motor adapted to be operated by said gas, and a brine tank in said connection between the container and the motor and containing brine through which the gas passes on its way to the motor.

CASSIUS C. PALMER.